Figure 2:
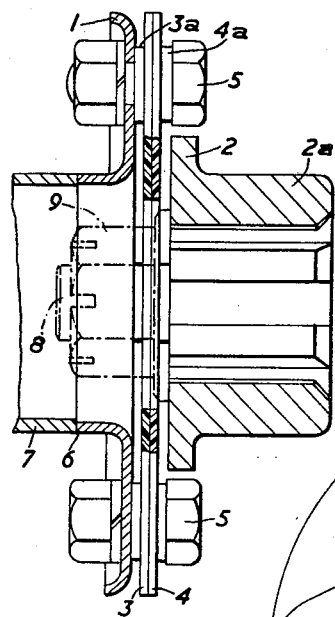

Nov. 6, 1962  D. BASTOW ET AL  3,062,025
FLEXIBLE COUPLINGS

Filed July 22, 1959  2 Sheets-Sheet 1

INVENTORS
DONALD BASTOW
LESLIE G. FREEMAN

BY Irvin S. Thompson

ATTORNEY

Nov. 6, 1962  D. BASTOW ET AL  3,062,025
FLEXIBLE COUPLINGS
Filed July 22, 1959  2 Sheets-Sheet 2

INVENTORS
DONALD BASTOW
LESLIE GAILLARD FREEMAN

BY Irvin S. Thompson
ATTORNEY

United States Patent Office 3,062,025
Patented Nov. 6, 1962

3,062,025
FLEXIBLE COUPLINGS
Donald Bastow, Stratford-on-Avon, and Leslie Gaillard Freeman, Berkswell, England, assignors to Birfield Engineering Limited, London, England
Filed July 22, 1959, Ser. No. 828,768
Claims priority, application Great Britain July 25, 1958
5 Claims. (Cl. 64—13)

This invention relates to flexible couplings of the disc-type which comprise a flexible disc or discs adapted to be bolted to angularly staggered driving and driven spiders of shafts disposed respectively on opposite sides of the discs.

Flexible disc couplings are commonly built up from fabric or steel laminae provided with a ring of equally spaced bolt holes, alternate holes being used to bolt the disc to one spider and the remainder being used for the other spider. Angular misalignment of the two spiders is accommodated by flexing of the disc between adjacent bolt holes, and the permissible degree of such misalignment for a given torque capacity of the coupling depends upon the relationship between the stress produced in the material of the discs and the maximum allowable value of that stress, i.e. upon the thickness of the disc and the relationship between the Young's modulus of the material and its fatigue strength. When using fabric laminae, usually of cotton, the laminae are often embedded in a rubber matrix and the characteristics of the rubber allow a considerable thickness of disc to be employed.

With fabric laminae the strength of each lamina varies acording to the direction of stress, being greatest in the direction of the fibres, and as a result for a given size of coupling the strength is less than would be the case if the material was homogeneous. When steel laminae are used they are arranged to rub on each other between the bolt holes and such an arrangement suffers from the disadvantage that the laminae tend to buckle and develop fatigue fractures individually between the bolt holes.

The object of the invention is to provide a disc-type flexible coupling which is cheap to manufacture and which, for given overall dimensions, will provide more satisfactory service than known forms of such couplings.

A disc-type flexible coupling according to the invention has a main body which is manufactured wholly or in part from a synthetic plastic material. The main body may be of single thickness, or comprise a plurality of laminae, moulded from the plastic material with localised thickenings in the regions of attachment to the spider arms. Preferably reinforcement is embodied in the main body, and this reinforcement may for example be of material such as glass fibre, in staple or woven form, or may itself comprise a synthetic plastic material.

When the main body is of reinforced plastic is is conveniently moulded from a plastic material such as a polyester resin, and when the main body is formed from non-reinforced plastic material it is formed of a high strength plastic material such as nylon, i.e. a synthetic linear polyamide.

In general, suitable synthetic plastic materials which are available for use in a coupling according to the invention which is formed mainly from the plastic material, preferably reinforced, have a less desirable relationship of ultimate strength to Young's modulus than is the case with rubber as used in the conventional rubberised fabric disc-type couplings and, in order to obtain the requisite thickness of coupling to secure the desired torque transmitting characteristics for a small overall radius, a coupling of this form may comprise a plurality of separate layers of plastic material, at least between the bolt holes.

The main body is locally thickened in the region of each bolt hole, and it may take the form of a unitary moulding which is of solid single thickness in the regions of the bolt holes with these regions interconnected by a plurality of separate thin layers of plastic material. Preferably these thin layers contain reinforcement, for example glass fibre, and metal bushes defining the bolt holes may be moulded into the disc.

It will be apparent that the total cross-sectional area of the coupling, between the bolt holes, depends upon the required torque capacity, the effective radius of the coupling and the maximum allowable driving stress in the material. This driving stress is additional to the bending stress imposed upon the coupling by angular misalignment of the shafts or their relative axial movement. The thickness of each layer or lamina between the bolt holes will be dependent upon the value of the bending stress, i.e. upon the curvature which relative movement of the spiders, both angular and axial, imposes upon the coupling and upon the elastic modulus of the disc, and the number of laminae will depend upon the thickness of each lamina as determined by the bending stress and upon the total cross-section required to withstand the maximum driving stress.

Figure 1:
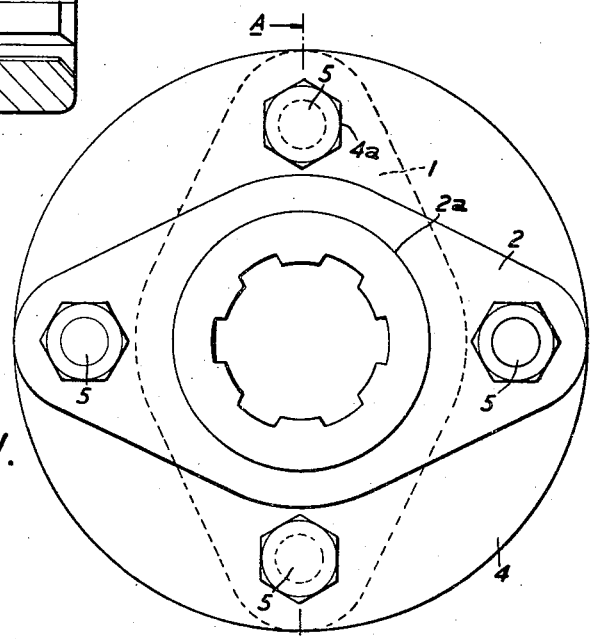
Figure 3:
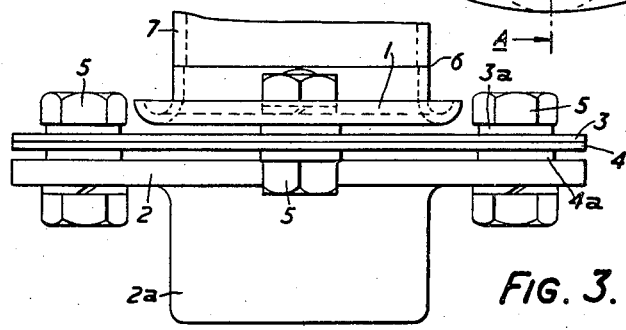
Figure 4:
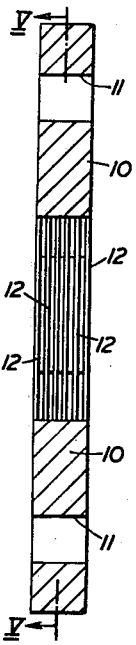
Figure 5:
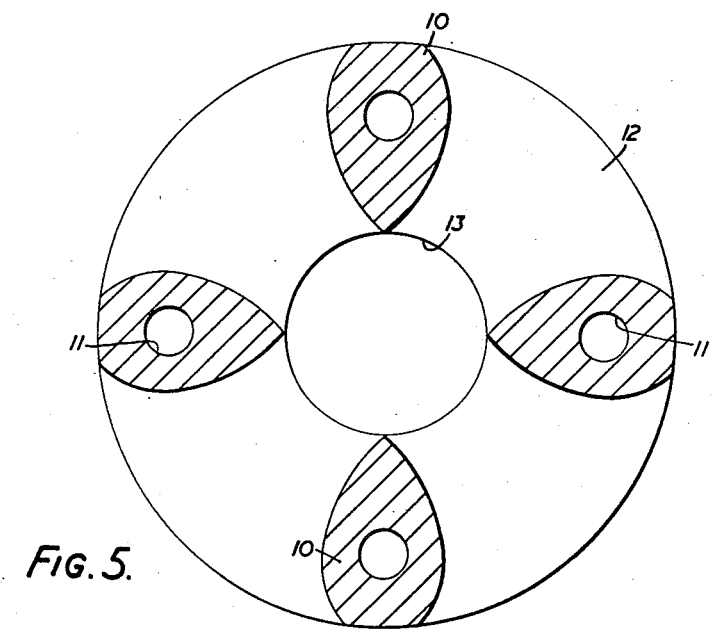

The invention will now be further described with reference to the accompanying drawings which illustrate, by way of example, a coupling arrangement and a modified coupling body therefor in accordance with the invention, and in which:

FIGURE 1 is an end view of the arrangement,
FIGURE 2 is an axial cross-sectional view, and
FIGURE 3 is an overhead plan view thereof,
FIGURE 4 is an axial cross-sectional view of the modified coupling body, and
FIGURE 5 is a sectional view on the line V—V in FIGURE 4.

The arrangement illustrated in FIGURES 1 to 3 includes two flanges 1 and 2 between which are bolted the main body of the coupling comprising two annular disc-like laminae or separate layers 3 and 4, hereinafter termed "discs," moulded from a synthetic plastic material. Both flanges are of generally elliptical shape with their major axes arranged at right angles to each other, two bolt holes centred on each of these axes being respectively aligned with two diametrically opposed bolt holes through the discs 3 and 4. The four bolt holes through the discs 3 and 4 are equiangularly arranged around a common pitch circle and accommodate bolts 5 which clamp the discs 3 and 4 to the flanges 1 and 2 respectively.

Each of the discs 3 and 4 is moulded with a flat surface, the two flat surfaces abutting in the assembled coupling, and with localised thickening providing projecting portions such at 3a and 4a surrounding each bolt hole. The portions 3a and 4a engage either the head of the corresponding bolt 5 or the corresponding flange 1 or 2, as shown clearly in FIGURES 2 and 3.

The flange 1 is a pressing with a tubular central portion which is flash-butt welded at 6 to a tubular drive shaft 7, and the flange 2 has a splined boss 2a for attachment to a splined shaft, such as the shaft the inner end of which is shown in chain-dotted lines at 8 in FIGURE 2. A castle nut 9 by which the flange 2 is held on the shaft 8 projects through the central apertures in the discs 3 and 4 into the tubular portion of the flange 1, so that in the event of failure of the coupling due to complete fracture of the discs the tubular shaft 7 will not fall free but will be supported by the nut 9.

For most applications it is desirable that the discs 3 and 4 should be suitably reinforced during moulding, by the incorporation of a material such as glass fibre.

FIGURES 4 and 5 illustrate a coupling disc or body which may be bolted between the flanges 1 and 2 of the preceding FIGURES, and the disc comprises a unitary moulding which is of solid single thickness at bosses 10 in the regions of and surrounding the bolt holes 11. The bosses 10 are interconnected by a plurality of separate thin layers 12 of the plastic material which are spaced apart in the axial direction.

The thin layers 12 contain reinforcement such as glass fibre and they result in a coupling of small radial dimensions for a high torque capacity, having the necessary effective cross-sectional area of the plastic material between the bolt holes 11 while providing a high degree of flexibility for the disc, due to the high flexibility of the individual spaced layers 12.

As with the arrangement of FIGURES 1 to 3, the disc of FIGURES 4 and 5 has a central aperture 13 which will support one of the connected shafts should the disc fail in service, and both the bosses 10 and the layers 12 extend throughout the full radial thickness of the disc.

We claim:

1. A flexible coupling comprising angularly staggered driving and driven spiders, and a disc-like flexible main body formed with bolt holes for attachment to the arms of said spiders, said main body comprising a plurality of discs moulded from synthetic plastic material with a plane face on one side and a plurality of projections on the other side, each of said projections surrounding one of said bolt holes to provide a localised thickening of the disc in the region of attachment to the corresponding spider arm.

2. A flexible coupling according to claim 1, wherein each of said discs embodies internal reinforcement such as glass fibre.

3. A flexible coupling comprising angularly staggered driving and driven spiders, and a disc-like flexible main body moulded from a synthetic plastic material with bolt holes for attachment to the arms of said spiders, said main body comprising two discs arranged back-to-back with plane faces in juxtaposition, the opposite face of each disc having a projection surrounding each of the bolt holes whereby to provide localised thickenings surrounding the bolt holes.

4. A flexible coupling comprising angularly staggered driving and driven spiders, and a disc-like flexible main body bolted between said spiders, said main body being formed as a unitary moulding from a synthetic plastic material with bolt holes surrounded by bosses which extend throughout the full axial thickness of the body, said bosses being interconnected by a plurality of spaced relatively thin layers of said plastic material which are spaced in the direction of said axial thickness.

5. A flexible coupling comprising angularly staggered driving and driven spiders, and a one-piece flexible disc-like coupling body fixed between said spiders, said body being of annular form with a central through aperture and moulded from a synthetic plastic material with fixing holes surrounded by bosses which are interconnected by spaced web-like layers of the plastic material, the bosses extending across the radial thickness of the body and throughout the axial thickness thereof and said layers also extending across said radial thickness but being spaced apart in the axial direction.

References Cited in the file of this patent

UNITED STATES PATENTS

| | | |
|---|---|---|
| 1,302,248 | Ungar | Apr. 29, 1919 |
| 1,334,439 | Davis | Mar. 23, 1920 |
| 1,359,157 | Dexter | Nov. 16, 1920 |
| 1,563,231 | Schell | Nov. 24, 1925 |
| 1,588,424 | Jencick | June 15, 1926 |
| 1,611,954 | Schell | Dec. 28, 1926 |
| 1,662,006 | Kimmich | Mar. 6, 1928 |
| 1,935,390 | Brown | Nov. 14, 1933 |
| 2,659,218 | Riopelle | Nov. 17, 1953 |
| 2,753,702 | Dunn | July 10, 1956 |
| 2,784,575 | Jencick | Mar. 12, 1957 |
| 2,859,599 | Case | Nov. 11, 1958 |
| 2,913,884 | Pfeifer | Nov. 24, 1959 |